United States Patent
Marada et al.

(10) Patent No.: US 7,524,450 B2
(45) Date of Patent: *Apr. 28, 2009

(54) METHOD FOR MANUFACTURING SILICON CARBIDE BASED HONEYCOMB STRUCTURE AND SILICON CARBIDE BASED HONEYCOMB STRUCTURE

(75) Inventors: Masashi Marada, Nagoya (JP); Shuichi Ichikawa, Handa (JP); Aiko Otsuka, Okazaki (JP); Atsushi Kaneda, Ichinomiya (JP); Yasushi Noguchi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 480 days.

This patent is subject to a terminal disclaimer.

(21) Appl. No.: 10/573,486

(22) PCT Filed: Sep. 29, 2004

(86) PCT No.: PCT/JP2004/014246

§ 371 (c)(1),
(2), (4) Date: Mar. 24, 2006

(87) PCT Pub. No.: WO2005/030675

PCT Pub. Date: Apr. 7, 2005

(65) Prior Publication Data

US 2007/0298958 A1    Dec. 27, 2007

(30) Foreign Application Priority Data

Sep. 30, 2003   (JP)   .................. 2003-339743

(51) Int. Cl.
*C04B 35/565* (2006.01)

(52) U.S. Cl. .................. 264/630; 428/116; 501/88

(58) Field of Classification Search .................. None
See application file for complete search history.

(56) References Cited

U.S. PATENT DOCUMENTS

| 4,851,376 A | * | 7/1989 | Asami et al. | ................. 501/119 |
| 7,208,108 B2 | * | 4/2007 | Otsuka et al. | ................. 264/44 |
| 2003/0041574 A1 | | 3/2003 | Noguchi et al. | |
| 2003/0057581 A1 | * | 3/2003 | Lu et al. | ................. 264/30 |

FOREIGN PATENT DOCUMENTS

| JP | 60-172506 | | 9/1985 |
| JP | B-03-072032 | | 3/1991 |
| JP | A-08-119726 | | 5/1996 |
| JP | A-2000-302533 | | 10/2000 |
| JP | A-2002-219319 | | 8/2002 |
| JP | A 2002-356377 | | 12/2002 |
| JP | A 2002-356383 | | 12/2002 |
| JP | A 2003-034582 | | 2/2003 |
| JP | WO-03/048073 | * | 6/2003 |
| JP | A 2004-224659 | | 8/2004 |
| WO | WO 97/36843 A1 | | 10/1997 |
| WO | WO 03/051488 A1 | | 6/2003 |
| WO | WO 2005/030675 A1 | | 4/2005 |

* cited by examiner

*Primary Examiner*—Ling Xu
(74) *Attorney, Agent, or Firm*—Oliff & Berridge, PLC

(57) ABSTRACT

There is provided a method for manufacturing a silicon carbide based honeycomb structure, the method using, as a part of a starting material, a recycled raw material recycled from a recovered material generated in a process for manufacturing the silicon carbide based honeycomb structure and derived from a starting material for a silicon carbide based honeycomb structure; wherein the recycled raw material is pulverized to have an average particle size of 10 to 300 µm. According to the present invention, structure defects such as voids or coarse particles, which have been problems upon manufacturing a silicon carbide based honeycomb structure, are hardly formed, and a silicon carbide based honeycomb structure having excellent strength and uniform heat conductivity can be obtained. In addition, since a once kneaded material is used as a part of a starting material, the time for kneading can be shortened.

5 Claims, No Drawings

METHOD FOR MANUFACTURING SILICON CARBIDE BASED HONEYCOMB STRUCTURE AND SILICON CARBIDE BASED HONEYCOMB STRUCTURE

TECHNICAL FIELD

The present invention relates to a method for manufacturing a silicon carbide based honeycomb structure and a silicon carbide based honeycomb structure.

BACKGROUND ART

There have recently been used honeycomb structures excellent in thermal resistance and corrosion resistance in various fields for diesel particulate filters (DPF) for trapping particulates exhausted from an diesel engine and catalyst carriers for loading a catalyst thereon for purifying automobile exhaust gas.

Such a honeycomb structure has a plurality of cells partitioned by porous partition walls and extending in the axial direction and can be manufactured by drying and firing a honeycomb formed body obtained by subjecting kneaded clay prepared by kneading a ceramic raw material powder, a binder, water, and the like, to a continuous extruder.

In a process for manufacturing the above honeycomb structure, inferiority such as deformation of cells or cracks is caused upon forming or drying and gives not a few inferior goods of undried or dried formed body recovered before finished goods are given. Therefore, it is preferable that a recovered material generated in a process for manufacturing the honeycomb structure and derived from a starting material for the honeycomb structure is reused as a recycled material from the view point of enhancing the recovery rate with respect to the raw material and inhibiting the yield of products from lowering.

There have conventionally known methods with regard to cordierite based honeycomb structures as methods for manufacturing a honeycomb structure using such a recycled raw material. In the case of manufacturing a new honeycomb structure by using, as a part of a starting material, a recycled raw material from a recovered material generated in a process for manufacturing a cordierite based honeycomb structure and derived from a starting material for the honeycomb structure, the resultant honeycomb structure has a larger thermal expansion coefficient in comparison with a cordierite based honeycomb structures produced by using an original starting raw material (raw material not containing a recycled raw material), and thereby the honeycomb structure tends to have lowered thermal impact resistance.

Therefore, in the case of applying the method to a product requiring high thermal impact resistance as a DPF or an exhaust gas purification catalyst carrier, a device of suppressing an increase in thermal expansion coefficient is necessary. For example, in a manufacture method described in the Patent Document 1, a product having low thermal expansion properties can be obtained by setting a cordierite reaction rate R (=protoenstatite/cordierite) to be 0.3 or less.

In addition, in a manufacture method described in the Patent Document 2, an unfired recycled raw material is pulverized to produce a pulverized material, pieces having a diameter of less than 1 mm are removed from the pulverized material, and a product is manufactured by using the rest of the pulverized material, thereby suppressing a rise in thermal expansion coefficient. Further, in a manufacture method described in the Patent Document 3, at least a part of the binder contained in the unfired recycled raw material is removed from the recycled raw material to make pulverization easier without deforming particles of the recycled raw material, thereby suppressing a rise in thermal expansion coefficient.

Patent Document 1: JP-B-3-72032

Patent Document 2: JP-A-119726

Patent Document 3: JP-A-302533

DISCLOSURE OF THE INVENTION

Any of the above conventional methods relates to a cordierite based honeycomb structure. There have recently been increasing the cases of using a silicon cordierite based honeycomb structure, which is excellent in heat resistance, as a honeycomb structure for a DPF or a catalyst carrier. A silicon carbide based honeycomb structure is generally manufactured by adding a metal silicon powder to a silicon carbide powder as necessary, kneading them together with water and a binder to obtain kneaded clay, subjecting the kneaded clay to extrusion, and drying and firing the extruded clay. However, since a silicon carbide powder and a metal silicon powder is prone to cohere when they contain moisture, there arises a problem of structure defects such as voids or coarse particles to easily lower strength and thermal conductivity.

If a recycled raw material once subjected to kneading can be used as a part of a starting raw material in manufacture of a silicon carbide based honeycomb structure as in the above conventional methods used for manufacture of a cordierite based honeycomb structure, dispersibility of the silicon carbide powder and the metal silicon powder is enhanced, and the occurrence of the above structure defects may be suppressed.

The present invention has been made in view of such situations and aims to provide a method for manufacturing a silicon carbide based honeycomb structure having excellent strength and uniform thermal conductivity by inhibiting cohesion of the silicon carbide powder and the metal silicon powder in the raw material and enhancing dispersibility of the raw material by the use of a recycled raw material from a recovered material generated in a process of producing a silicon carbide based honeycomb structure and derived from a starting raw material as a part of a starting raw material.

According to the present invention, there is provided a method for manufacturing a silicon carbide based honeycomb structure, the method using, as a part of a starting material, a recycled raw material recycled from a recovered material generated in a process for manufacturing the silicon carbide based honeycomb structure and derived from a starting material for a silicon carbide based honeycomb structure; wherein the recycled raw material is pulverized to have an average particle size of 10 to 300 μm (first manufacture method).

According to the present invention, there is also provided a method for manufacturing a silicon carbide based honeycomb structure, wherein an unpulverized silicon carbide based honeycomb structure and a new raw material are used as a starting material, water is added to the starting material, the starting material is kneaded with being pulverized to give kneaded clay, and a new silicon carbide based honeycomb structure is manufactured by using the kneaded clay (second manufacture method).

According to the present invention, there is further provided a silicon carbide based honeycomb structure manufactured by a method according to any one of the above manufacture methods.

According to the present invention, since a recovered material generated in a process of manufacturing a silicon carbide based honeycomb structure and derived from a starting raw material of the honeycomb structure, that is, a material which has already been subjected to kneading once is used as a part of a raw material, dispersibility of the silicon carbide powder and the metal silicon powder is enhanced in comparison with the case of using only an original starting raw material without using such a recovered material, thereby inhibiting cohesion of these powders. Therefore, structure defects such as voids or coarse particles, which have been problems upon manufacturing a silicon carbide based honeycomb structure, are hardly formed, and a silicon carbide based honeycomb structure having excellent strength and uniform heat conductivity can be obtained. In addition, since a once kneaded material is used as a part of a starting material, the time for kneading can be saved.

BEST MODE FOR CARRYING OUT THE INVENTION

The first manufacture method of the present invention, is a method for manufacturing a silicon carbide based honeycomb structure, the method using, as a part of a starting material, a recycled raw material recycled from a recovered material generated in a process for manufacturing the silicon carbide based honeycomb structure and derived from a starting material for a silicon carbide based honeycomb structure; wherein the recycled raw material is pulverized to have an average particle size of 10 to 300 μm.

A recovered material generated in a process for manufacturing the silicon carbide based honeycomb structure and derived from a starting material for the honeycomb structure is specifically, an undried formed body and a dried formed body recovered before finished goods are given due to generation of inferiority such as deformation of cells or cracks upon forming or drying, or a cutting margin due to machining. These are made from a raw material which has once kneaded and is in a state that a binder and a pore-forming material are present in the periphery of the silicon carbide powder and the metal silicon powder which are raw materials and powders hardly cohere.

Therefore, by a recycled raw material recycled by pulverizing such a recovered material as a part of the starting material, dispersibility of the silicon carbide powder and the metal silicon powder are improved, cohesion of the powders is inhibited, and thereby structure defects such as voids or coarse particles are hardly formed. As a result, a silicon carbide honeycomb structure having excellent strength and uniform thermal conductivity can be obtained. In addition, since a material which has once been kneaded is used as a part of the starting material, the time for kneading can be shortened.

As a method for pulverizing the recovered material, there are a dry pulverization method and a wet pulverization method. Examples of the dry pulverization method includes methods using a hummer mill, a disinter, a Raymondmill, a cogged roll crusher, a corrugated roll crusher, or an impact crusher.

In the first manufacture method of the present invention, the recycled raw material has an average particle size of 10 to 300 μm. In the case of using a recycled raw material as in the present invention, cohesion is hardly caused. However, when the recycled raw material has an average particle size of above 300 μm, a portion having low strength is generated at the boundary between a new raw material and the recycled raw material, and as a result, strength of the honeycomb structure is lowered. When the recycled raw material is pulverized to have an average diameter of less than 10 μm, efficiency in pulverization is poor, and not only cost is increased, but also abrasion of a pulverization device is increased, and thereby impurities are prone to get mixed.

As the recycled raw material, a material pulverized with a disinter, a Raymond mill, or the like, may be used as it is. However, by sieving the pulverized material to specify the particle size, kneadability is improved to reduce inferiority. The recycled raw material preferably accounts for 50% by mass or less in the whole starting material. When the ratio of the recycled raw material is above 50% by mass, plasticity of kneaded clay is lowered to easily generate cracks or deformations upon extrusion forming.

The second manufacture method of the present invention is a method for manufacturing a new silicon carbide based honeycomb structure by using kneaded clay prepared by kneading a mixture of an unpulverized silicon carbide based honeycomb structure and a new raw material as a starting raw material with adding water thereto. The second manufacture method employs a once kneaded raw material as a part of starting raw material as in the first manufacture method and can give an effect similar to that of the first manufacture method. However, in the second manufacture method, previous pulverization is not conducted before the unpulverized silicon carbide based honeycomb structure is mixed with a new raw material, and pulverization is conducted in a wet pulverization method with kneading the unpulverized silicon carbide based honeycomb structure with anew raw material.

As a wet pulverizing method, a method in which a mixer is used is generally employed. A suitable mixer is the Intensive Mixer produced by Eirich. A new raw material and an unpulverized silicon carbide based honeycomb structure are put in a pan, an agitator is rotated, and the above honeycomb structure is pulverized and mixed with the new raw material. Since the above honeycomb structure was formed by once kneading a mixture of a silicon carbide powder and auxiliary raw materials such a binder, a pore-forming material, and auxiliary; cohesion of the silicon carbide particles and the metal silicon particles can be inhibited even when the mixing with a new raw material is conducted in a wet method like the mixing in a dry method.

Incidentally, upon pulverization and kneading in the aforementioned wet method, a binder may be added besides water. The unpulverized silicon carbide honeycomb structure preferably accounts for 50% by mass or less in the whole starting raw material. When the ratio is above 50% by mass, plasticity of kneaded clay is lowered to easily generate cracks or deformations upon extrusion forming.

Since a silicon carbide honeycomb structure of the present invention is produced by the first or second manufacture method described above and has excellent strength and uniform thermal conductivity, it can suitably be used as a DPF, an exhaust gas purification catalyst carrier.

EXAMPLE

The present invention will hereinbelow be described in more detail on the basis of Examples. However, the present invention is by no means limited to these Examples.

Examples 1 to 4, Comparative Examples 1 and 2

A silicon carbide powder and a metal silicon powder both having an average particle size of 48 μm were mixed in the ratio of 80:20 (mass ratio) to give a mixture. To the mixture were added starch as a pore-forming material, methylcellulose (a binder), a surfactant, an auxiliary, and water, and the mixture was kneaded with a kneader. The binder was added by the superaddition of 10% by mass with respect of 100% by mass of a total amount of the silicon carbide powder and the metal silicon powder. The kneaded clay obtained was subjected to extrusion forming with an extruder to give a honeycomb formed body, which was then subjected to microwave drying, followed by hot air drying at 120° C. for 30 minutes to give a honeycomb dried body. The honeycomb dried body was coarsely pulverized with a hammer and then minutely pulverized with a disinter, and sieving was conducted with a sieve having a diameter of 149 μm to obtain particles having an average particle size of 50 μm, which was used as a recycled raw material.

Next, a new raw material prepared by mixing a silicon carbide powder and a metal silicon powder both having an average particle size of 48 μm in the ratio of 80:20 (mass ratio) was blended with the above recycled raw material so that a ratio of the recycled raw material be made 0% by mass (only the new raw material), 10% by mass, 30% by mass, 50% by mass, 60% by mass, and 100% by mass (only the recycled bending strength, and thermal conductivity. Incidentally, porosity and average pore diameter was measured with a mercury porosimeter (AUTORORE produced by Shimadzu Corp), and three point bending strength was measured with cutting a film face of the honeycomb structure. Thermal conductivity was measured in a steady method (measurement device: GH-1S produced by ULVAC-RIKO).

As shown in Table 1, Examples 1 to 4 and Comparative Example 2, in which a recycled raw material was used, had high strength and high thermal conductivity in comparison with Comparative Example 1, in which only a new raw material was used for manufacture of the honeycomb structure. This seems to be because usage of a once kneaded recycled raw material improved dispersibility to inhibit cohesion of the silicon carbide powder and the metal silicon powder. However, regarding the Comparative Example 2, which was manufactured only with a recycled raw material, kneaded clay had low plasticity in comparison with Examples 1 to 4, and therefore, inferiority such as cracks and deformations may be generated in a formed body upon extrusion forming.

TABLE 1

| | Ratio of recycled raw material (mass %) | Temperature for drying (° C.) | Pulverization device | Average particle size of recycled raw material (μm) | Time for kneading (min.) | Amount of binder (mass %) | Plasticity (kg/cm²) | Porosity (%) | Average pore diameter (μm) | Three point bending strength (MPa) | Thermal conductivity (W/mK) |
|---|---|---|---|---|---|---|---|---|---|---|---|
| Comparative Example 1 | 0 | 120 | — | 50 | 60 | 0 | 20. | 53 | 23.6 | 20.3 | 15.2 |
| Example 1 | 10 | 120 | disinter | 50 | 40 | 3 | 2.1 | 54 | 23.5 | 25.1 | 18.1 |
| Example 2 | 30 | 120 | disinter | 50 | 40 | 3 | 2.0 | 51 | 23.1 | 27.2 | 17.5 |
| Example 3 | 50 | 120 | disinter | 50 | 40 | 3 | 2.0 | 51 | 22.9 | 26.5 | 17.3 |
| Example 4 | 60 | 120 | disinter | 50 | 40 | 3 | 1.6 | 52 | 23.2 | 25.4 | 17.8 |
| Comparative Example 2 | 100 | 120 | disinter | 50 | 40 | 3 | 1.0 | 53 | 21.8 | 27.0 | 18.2 | material) to give a mixture. To the mixture was added starch as a pore-forming material, and were further added methylcellulose (a binder), a surfactant, an auxiliary, and water; and the mixture was kneaded with a kneader. An amount of the binder is as shown in Table 1, which is shown by a superaddition ratio with respect to the amount of the recycled raw material. The obtained kneaded clay was measured for plasticity and then subjected to extrusion forming with an extruder to give a honeycomb formed body, which was subjected to microwave drying, followed by hot air drying at 120° C. for 30 minutes. After the drying, the honeycomb dried body was fired at 1450° C. for 2 hours to obtain a silicon carbide based honeycomb structure having an end face of 35 mm×35 mm, a length of 254 mm, a partition wall thickness of 300 μm, and a cell density of 45 to 50/cm².

Each of the honeycomb structures obtained above was measured for porosity, average pore diameter, three point Examples 5 to 7, Comparative Examples 3 and 4

Silicon carbide based honeycomb structures were manufactured in the same manner as in Examples 1 to 4 and Comparative Examples 1 and 2 except that minute pulverization upon preparing a recycled raw material was conducted with a Raymond mill instead of a disinter and measured for porosity, average pore diameter, three point bending strength, and thermal conductivity in the same manner. The results are shown in Table 2, and the results of using a Raymond mill are almost the same as in the case of using a disinter. It can be considered that the usage of a recycled raw material improved dispersibility of the silicon carbide powder and the metal silicon powder. The point of lowering plasticity of the kneaded clay when the ratio of the recycled raw material exceeded 50% mass was also the same as in the case of using a disinter.

TABLE 2

| | Ratio of recycled raw material (mass %) | Temperature for drying (° C.) | Pulverization device | Average particle size of recycled raw material (μm) | Time for kneading (min.) | Amount of binder (mass %) | Plasticity (kg/cm²) | Porosity (%) | Average pore diameter (μm) | Three point bending strength (MPa) | Thermal conductivity (W/mK) |
|---|---|---|---|---|---|---|---|---|---|---|---|
| Example 5 | 10 | 120 | Raymond mill | 50 | 40 | 3 | 2.2 | 51 | 22.0 | 26.5 | 17.8 |
| Example 6 | 30 | 120 | Raymond mill | 50 | 40 | 3 | 2.1 | 51 | 21.1 | 24.8 | 17.5 |
| Example 7 | 50 | 120 | Raymond mill | 50 | 40 | 3 | 2.0 | 52 | 20.9 | 26.2 | 17.3 |

TABLE 2-continued

|  | Ratio of recycled raw material (mass %) | Temperature for drying (° C.) | Pulverization device | Average particle size of recycled raw material (μm) | Time for kneading (min.) | Amount of binder (mass %) | Plasticity (kg/cm²) | Porosity (%) | Average pore diameter (μm) | Three point bending strength (MPa) | Thermal conductivity (W/mK) |
|---|---|---|---|---|---|---|---|---|---|---|---|
| Comparative Example 3 | 60 | 120 | Raymond mill | 50 | 40 | 3 | 1.5 | 53 | 20.8 | 26.3 | 16.8 |
| Comparative Example 4 | 100 | 120 | Raymond mill | 50 | 40 | 3 | 1.1 | 51 | 20.8 | 26.8 | 16.9 |

Examples 8 to 10

Silicon carbide based honeycomb structures were manufactured in the same manner as in Examples 5 to 7 and Comparative Examples 3 and 4 except that a binder was not added when silicon carbide based honeycomb structures were manufactured by using a recycled raw material, and measured for porosity, average pore diameter, three point bending strength, and thermal conductivity in the same manner. The results are shown in Table 3 and almost the same as in the case of adding a binder. It can be considered that, since a binder added when a recycled raw material was manufactured was not burnt down even through drying at 120° C. and was present in the recycled raw material with keeping the properties, predetermined properties were obtained without adding a binder again.

Examples 11 to 16, Comparative Examples 5 and 6

Silicon carbide based honeycomb structures were manufactured in the same manner as in Examples 5 to 7 and Comparative Examples 3 and 4 except that the average particle size of the raw material was varied within the range of 10 to 1000 μm and measured for porosity, average pore diameter, three point bending strength, and thermal conductivity in the same manner. The results were shown in Table 4, and Comparative Examples 5 and 6, each of which has an average particle size of above 300 μm, were by far inferior in three point bending strength in comparison with Examples 11 to 16, in which a recycled raw material having an average particle diameter within the range of 10 to 300 μm. It can be considered that strength is lowered because a recycled raw material having a large particle size has inferior kneadability with a new raw material.

TABLE 3

|  | Ratio of recycled raw material (mass %) | Temperature for drying (° C.) | Pulverization device | Average particle size of recycled raw material (μm) | Time for kneading (min.) | Amount of binder (mass %) | Porosity (%) | Average pore diameter (μm) | Three point bending strength (MPa) | Thermal conductivity (W/mK) |
|---|---|---|---|---|---|---|---|---|---|---|
| Example 8 | 10 | 120 | Raymond mill | 50 | 40 | 0 | 52 | 22.1 | 26.9 | 17.3 |
| Example 9 | 30 | 120 | Raymond mill | 50 | 40 | 0 | 52 | 22.0 | 27.1 | 17.8 |
| Example 10 | 90 | 120 | Raymond mill | 50 | 40 | 0 | 53 | 23.1 | 25.0 | 17.4 |

TABLE 4

|  | Ratio of recycled raw material (mass %) | Temperature for drying (° C.) | Pulverization device | Average particle size of recycled raw material (μm) | Time for kneading (min.) | Amount of binder (mass %) | Porosity (%) | Average pore diameter (μm) | Three point bending strength (MPa) | Thermal conductivity (W/mK) |
|---|---|---|---|---|---|---|---|---|---|---|
| Example 11 | 30 | 120 | Raymond mill | 10 | 40 | 1 | 52 | 23.3 | 26.2 | 18.2 |
| Example 12 | 30 | 120 | Raymond mill | 35 | 40 | 1 | 52 | 22.9 | 25.9 | 18.0 |
| Example 13 | 30 | 120 | Raymond mill | 100 | 40 | 1 | 53 | 22.1 | 26.4 | 18.3 |
| Example 14 | 30 | 120 | Raymond mill | 150 | 40 | 1 | 53 | 21.0 | 25.1 | 18.9 |
| Example 15 | 30 | 120 | Raymond mill | 200 | 40 | 1 | 53 | 23.1 | 27.3 | 16.9 |
| Example 16 | 30 | 120 | Raymond mill | 300 | 40 | 1 | 54 | 22.1 | 27.1 | 17.5 |
| Comparative Example 5 | 30 | 120 | Raymond mill | 400 | 40 | 1 | 53 | 21.9 | 20.4 | 18.6 |
| Comparative Example 6 | 30 | 120 | Raymond mill | 1000 | 40 | 1 | 50 | 20.9 | 18.9 | 18.4 |

Examples 17 to 19

The time for kneading was planned to be shortened when a recycled raw material was kneaded together with a new raw material used an effect in improving dispersibility due to the use of a recycled raw material. Silicon carbide based honeycomb structures were manufactured in the same manner as in Examples 5 to 7 and Comparative Examples 3 and 4 except that the time for kneading the recycled raw material and the new raw material was 60 minutes, 30 minutes, and 20 minutes, respectively, and measured for porosity, average pore diameter, three point bending strength, and thermal conductivity in the same manner. The results are shown in Table 5. There was no large difference in pore properties, strength, and thermal properties regardless of the difference in kneading time, and it was confirmed that the time saving for kneading could be planned by the use of a recycled raw material.

TABLE 5

| | Ratio of recycled raw material (mass %) | Temperature for drying (° C.) | Pulverization device | Average particle size of recycled raw material (μm) | Time for kneading (min.) | Amount of binder (mass %) | Porosity (%) | Average pore diameter (μm) | Three point bending strength (MPa) | Thermal conductivity (W/mK) |
|---|---|---|---|---|---|---|---|---|---|---|
| Example 17 | 30 | 120 | Raymond mill | 50 | 60 | 1 | 52 | 21.4 | 26.3 | 18.2 |
| Example 18 | 30 | 120 | Raymond mill | 50 | 30 | 1 | 51 | 22.6 | 27.5 | 18.0 |
| Example 19 | 30 | 120 | Raymond mill | 50 | 20 | 1 | 52 | 21.6 | 25.9 | 18.4 |

Examples 20 to 23

The drying temperature for manufacturing a recycled raw material was varied within the range from room temperature to 400° C. to perform a recycle test of a recycled raw material. The time for drying was 30 minutes, and the ratio of the recycled raw material when it was mixed with a new raw material was 30% by mass. As shown in Table 6, as the temperature for drying increases, an amount of the binder added when the recycled raw material was mixed with a new raw material was increased. This is because, as the temperature for drying upon manufacturing a recycled raw material rises, deterioration of the binder due to oxidation proceeds, and the necessity of compensation for a loss of binder increases. Incidentally, with regard to Example 20, in which drying was conducted at room temperature, a binder was not added again on the assumption that almost all the binder added upon manufacturing the recycled raw material remains. Silicon carbide based honeycomb structures were manufactured in the same manner as in Examples 5 to 7 and Comparative Examples 3 and 4 except for the above conditions and measured for porosity, average pore diameter, three point bending strength, and thermal conductivity in the same manner. The results are shown in Table 6. There was no large difference in pore properties, strength, and thermal properties.

TABLE 6

| | Ratio of recycled raw material (mass %) | Temperature for drying (° C.) | Pulverization device | Average particle size of recycled raw material (μm) | Time for kneading (min.) | Amount of binder (mass %) | Porosity (%) | Average pore diameter (μm) | Three point bending strength (MPa) | Thermal conductivity (W/mK) |
|---|---|---|---|---|---|---|---|---|---|---|
| Example 20 | 30 | Room temperature | Raymond mill | 50 | 40 | 0 | 52 | 22.5 | 26.2 | 18.2 |
| Example 21 | 30 | 200 | Raymond mill | 50 | 40 | 2 | 54 | 23.4 | 25.4 | 18.1 |
| Example 22 | 30 | 300 | Raymond mill | 50 | 40 | 3 | 51 | 21.9 | 25.1 | 17.8 |
| Example 23 | 30 | 400 | Raymond mill | 50 | 40 | 5 | 53 | 22.8 | 24.9 | 17.3 |

Examples 24 and 25

Honeycomb dried bodies before being pulverized were obtained in the same manner as in Examples 1 to 4 and Comparative Examples 1 and 2 and mixed with a new raw material without pulverization. The ratios of the honeycomb dried body in the mixture were 10% and 30%, respectively. Since it was difficult to weigh the accurate amount using only the honeycomb dried bodies, the amount was adjusted by adding coarsely pulverized pieces of a honeycomb dried body. Water was added to the solid raw materials, and the mixture was kneaded with the Intensive Mixer produced by Eirich. With regard to Example 24, a binder was added upon kneading the mixture. After the kneading with the Intensive Mixer, the kneaded clay was obtained through a kneading machine. Silicon carbide based honeycomb structures were produced in the same manner as in Examples 1 to 4 and Comparative Examples 1 and 2 using the kneaded clay and measured for porosity, average pore diameter, three point bending strength, and thermal conductivity in the same manner. The results are shown in Table 7. There was no large difference from the case of using a recycled raw material pulverized in a dry method. In addition, the time for kneading with the above Intensive Mixer was 3 minutes, and saving of the time in the manufacture process could be planned.

TABLE 7

| | Ratio of honeycomb dried body (mass %) | Temperature for drying (° C.) | Pulverization device | Time for kneading (min.) | Amount of binder (mass %) | Porosity (%) | Average pore diameter (μm) | Three point bending strength (MPa) | Thermal conductivity (W/mK) |
|---|---|---|---|---|---|---|---|---|---|
| Example 24 | 10 | 120 | Intensive Mixer | 3 | 3 | 52 | 22.1 | 25.3 | 19.7 |
| Example 25 | 30 | 120 | Intensive Mixer | 3 | 0 | 52 | 22.3 | 26.4 | 18.6 |

Example 26

An undried honeycomb structure was obtained in the same manner as in Examples 1 to 4 and Comparative Examples 1 and 2 and just left at room temperature. In a state that water is still contained in the honeycomb structure, the honeycomb structure was mixed with a new raw material. The ratio of the honeycomb formed body in the mixture was 30%. Since it was difficult to weigh the accurate amount using only the honeycomb formed body, the amount was adjusted by adding coarsely pulverized pieces of a honeycomb formed body. Water and a binder was added to the solid raw materials, and the mixture was kneaded with the Intensive Mixer produced by Eirich. After the kneading with the Intensive Mixer, the kneaded clay was obtained through a kneading machine. Silicon carbide based honeycomb structure was produced in the same manner as in Examples 1 to 4 and Comparative Examples 1 and 2 using the kneaded clay and measured for porosity, average pore diameter, three point bending strength, and thermal conductivity in the same manner. The results are shown in Table 8. There was no large difference from the case of using a recycled raw material pulverized in a dry method. In addition, the time for kneading with the above Intensive Mixer was 3 minutes, and saving of the time in the manufacture process could be planned.

TABLE 8

| | Ratio of honeycomb dried body (mass %) | Temperature for drying (° C.) | Pulverization device | Time for kneading (min.) | Amount of binder (mass %) | Porosity (%) | Average pore diameter (μm) | Three point bending strength (MPa) | Thermal conductivity (W/mK) |
|---|---|---|---|---|---|---|---|---|---|
| Example 26 | 30 | Room temperature | Intensive mixer | 3 | 3 | 53 | 22.3 | 25.5 | 18.6 |

INDUSTRIAL APPLICABILITY

The present invention can suitable be applied to manufacture of a filter (DPF) for trapping and removing particulate matter contained in dust-containing fluid such as exhaust gas from a diesel engine or a catalyst carrier for carrying a catalyst component for purifying harmful substances in exhaust gas.

The invention claimed is:

1. A method for manufacturing a silicon carbide based honeycomb structure, comprising:
   using, as a part of a starting material, a recycled raw material recycled from a recovered material generated in a process for manufacturing the silicon carbide based honeycomb structure and derived from a starting material for a silicon carbide based honeycomb structure;
   pulverizing the recycled raw material to an average particle size of 10 to 300 μm; and
   manufacturing a new silicon carbide based honeycomb structure by using the pulverized recycled raw material.

2. A method for manufacturing a silicon carbide based honeycomb structure according to claim 1, wherein the recycled raw material accounts for 50% by mass or less of a whole starting raw material.

3. A method for manufacturing a silicon carbide based honeycomb structure, comprising:
   using an unpulverized silicon carbide based honeycomb structure and a new raw material as a starting material and wherein the unpulverized silicon carbide based honeycomb structure accounts for 50% by mass or less of the starting raw material;
   adding water to the starting material;
   kneading and pulverizing the starting material form kneaded clay; and
   manufacturing a new silicon carbide based honeycomb structure by using the kneaded clay.

4. A method for manufacturing a silicon carbide based honeycomb structure according to claim 3, further comprising:
   adding a binder to the starting material for kneading.

5. A method for manufacturing a silicon carbide based honeycomb structure according to claim 3, wherein the kneading and pulverizing step comprises:
   pulverizing the silicon carbide in the starting material to an average size of 10 to 300 μm.

* * * * *